US012322369B2

(12) United States Patent
Jahani et al.

(10) Patent No.: US 12,322,369 B2
(45) **Date of Patent: *Jun. 3, 2025**

(54) METHOD OF SELECTIVELY BROADCASTING CLASSES OF SIGNALS WHILE ATTENUATING OTHER CLASSES

(71) Applicant: Purdue Research Foundation, West Lafayette, IN (US)

(72) Inventors: Shima Jahani, West Lafayette, IN (US); Hayden Scott Bishop, Lafayette, IN (US); Lauren Taylor Coyle, West Lafayette, IN (US); Colten Robert Dettmer, Ossian, IN (US); Arjun Gairola, West Lafayette, IN (US); Michael Rosswurm, West Lafayette, IN (US); Nicholas Wacyk, Yonker, NY (US); Kai Zhor Wung, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 231 days.

This patent is subject to a terminal disclaimer.

(21) Appl. No.: 18/201,730

(22) Filed: May 24, 2023

(65) Prior Publication Data

US 2023/0335103 A1 Oct. 19, 2023

Related U.S. Application Data

(63) Continuation-in-part of application No. 18/134,242, filed on Apr. 13, 2023, now Pat. No. 12,293,751.

(60) Provisional application No. 63/330,567, filed on Apr. 13, 2022.

(51) Int. Cl.

| | |
|---|---|
| ***G10K 11/16*** | (2006.01) |
| ***G10K 11/178*** | (2006.01) |

(52) U.S. Cl.
CPC .. *G10K 11/17853* (2018.01); *G10K 11/17827* (2018.01)

(58) Field of Classification Search
CPC .................... G10K 11/17853; G10K 11/17827
USPC ................................................ 381/71.8, 71.1
See application file for complete search history.

(56) References Cited

U.S. PATENT DOCUMENTS

2011/0293103 A1* 12/2011 Park ................ G10K 11/17854 381/57
2020/0074978 A1* 3/2020 Maeno ................... H04R 1/403
2023/0335099 A1* 10/2023 Jahani ............. G10K 11/17823

* cited by examiner

*Primary Examiner* — Ammar T Hamid
(74) *Attorney, Agent, or Firm* — Piroozi-IP, LLC

(57) ABSTRACT

A method is disclosed which includes receiving an incoming time-varying signal as ambient signal, applying a signal cancellation filter to the incoming time-varying signal to thereby generate an attenuated version of the incoming time-varying signal, selectively choosing one or more selected classes of signals to be broadcasted while other signals are to be attenuated, continually applying the incoming time-varying signal to a classifier to identify presence of the one or more selected classes in the incoming time-varying signal, adding a snippet of a pre-recorded signal associated with each of the identified classes to thereby generate a string of signal snippets associated with the identified classes, and repeating in a loop, combining the attenuated version of the received time-varying signal with the repeated string of signal snippets and broadcasting the combination.

19 Claims, 13 Drawing Sheets
(12 of 13 Drawing Sheet(s) Filed in Color)

METHOD OF SELECTIVELY BROADCASTING CLASSES OF SIGNALS WHILE ATTENUATING OTHER CLASSES

CROSS-REFERENCE TO RELATED APPLICATIONS

The present patent application is a continuation-in-part application which claims priority to U.S. Non-Provisional application Ser. No. 18/134,242, entitled INTERACTIVE NOISE CANCELLING HEADPHONE, which was filed Apr. 13, 2023 and which is related to and claims the priority benefit of U.S. Provisional Patent Application Ser. No. 63/330,567 filed Apr. 13, 2022, the contents of which are hereby incorporated by reference in its entirety into the present disclosure.

STATEMENT REGARDING GOVERNMENT FUNDING

None.

TECHNICAL FIELD

The present disclosure generally relates to noise cancelling devices and in particular to a novel interactive noise cancelling headphone.

BACKGROUND

This section introduces aspects that may help facilitate a better understanding of the disclosure. Accordingly, these statements are to be read in this light and are not to be understood as admissions about what is or is not prior art.

Noise pollution from construction activities is a major factor jeopardizing occupational health for workers. Over 30 million construction workers are exposed to prolonged noise daily. With different work trades on a given construction site, the area is considered loud and noisy. While a worker can wear an ear-protection device, such devices muffle all sounds which cause the worker to miss important other sounds. Thus, standard ear-protection devices do not adequately filter out ambient environmental noise while leaving other sounds unattenuated. This is also experienced by passengers on a noisy airplane. User's wearing standard earphones must raise the volume of the sound to overcome the environmental noise, which in addition to causing damage to the person's hearing, it is considered dangerous in the work environment as people on the site need to communicate and be vigilant about important other sounds on the site. Another issue that the workers on jobsites are facing is the comfort of the current hearing protections, as headphones are considered uncomfortable and earplugs do not provide an active sound-blocking technology.

Therefore, there is an unmet need for a novel approach to selectively reduce ambient sound that is viewed as noise while allowing other sounds unattenuated.

SUMMARY

A method of selectively passing through signals associated with one or more classes of signals while attenuating other signals is disclosed. The method includes receiving an incoming time-varying signal as ambient signal by one or more sensors, applying a signal cancellation filter to the incoming time-varying signal to thereby generate an attenuated version of the incoming time-varying signal, selectively choosing one or more selected classes amongst a plurality of classes of signals to be broadcasted while other signals are to be attenuated, continually applying the incoming time-varying signal to a classifier to identify presence of the one or more selected classes in the incoming time-varying signal. For each of the one or more selected classes identified as being present by the classifier, the method includes adding a snippet of a pre-recorded signal associated with each of the identified classes each followed by a period of substantially no signal to thereby generate a string of signal snippets associated with the identified classes, and repeating the string of signal snippets in a loop. The method also includes combining the attenuated version of the received time-varying signal with the repeated string of signal snippets to thereby generate a time-varying outgoing signal, and broadcasting the time-varying outgoing signal through one or more transducers.

Another method of selectively passing through signals associated with one or more classes of signals while attenuating other signals is also disclosed. The method includes receiving an incoming time-varying signal as ambient signal by one or more sensors, establishing a time-varying incoming signal spectrum, selectively choosing one or more selected classes amongst a plurality of classes of signals to be broadcasted while other signals are to be attenuated, continually applying the incoming time-varying signal to a classifier to identify presence of the one or more selected classes in the incoming time-varying signal. For each of the one or more selected classes identified as being present by the classifier, the method includes isolating a spectrum associated with the identified class. The method further includes combining all isolated spectra associated with all the identified classes as a pass-through spectrum, removing the pass-through spectrum from the incoming time-variant signal spectrum to thereby generate an all-reject spectrum, establishing a 180° phase-shifted spectrum of the all-reject spectrum, applying the all-reject spectrum by the incoming time-variant signal spectrum to thereby generate an all-pass spectrum, converting the all-pass spectrum to a time-variant outgoing signal, and broadcasting the time-varying outgoing signal through one or more transducers.

Another method of selectively passing through signals associated with one or more classes of signals while attenuating other signals is disclosed. The method includes receiving an incoming time-varying signal as ambient signal by one or more sensors, establishing a time-varying incoming signal spectrum, selectively choosing one or more selected classes amongst a plurality of classes of signals to be broadcasted while other signals are to be attenuated, and continually applying the incoming time-varying signal to a classifier to identify presence of the one or more selected classes in the incoming time-varying signal. For each of the one or more selected classes identified as being present by the classifier the method includes isolating a spectrum associated with the identified class, combining one or more bandpass filters associated with each of the isolated spectrum to thereby generating an all-pass spectrum, converting the all-pass spectrum to a time-variant outgoing signal, and broadcasting the time-varying outgoing signal through one or more transducers.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
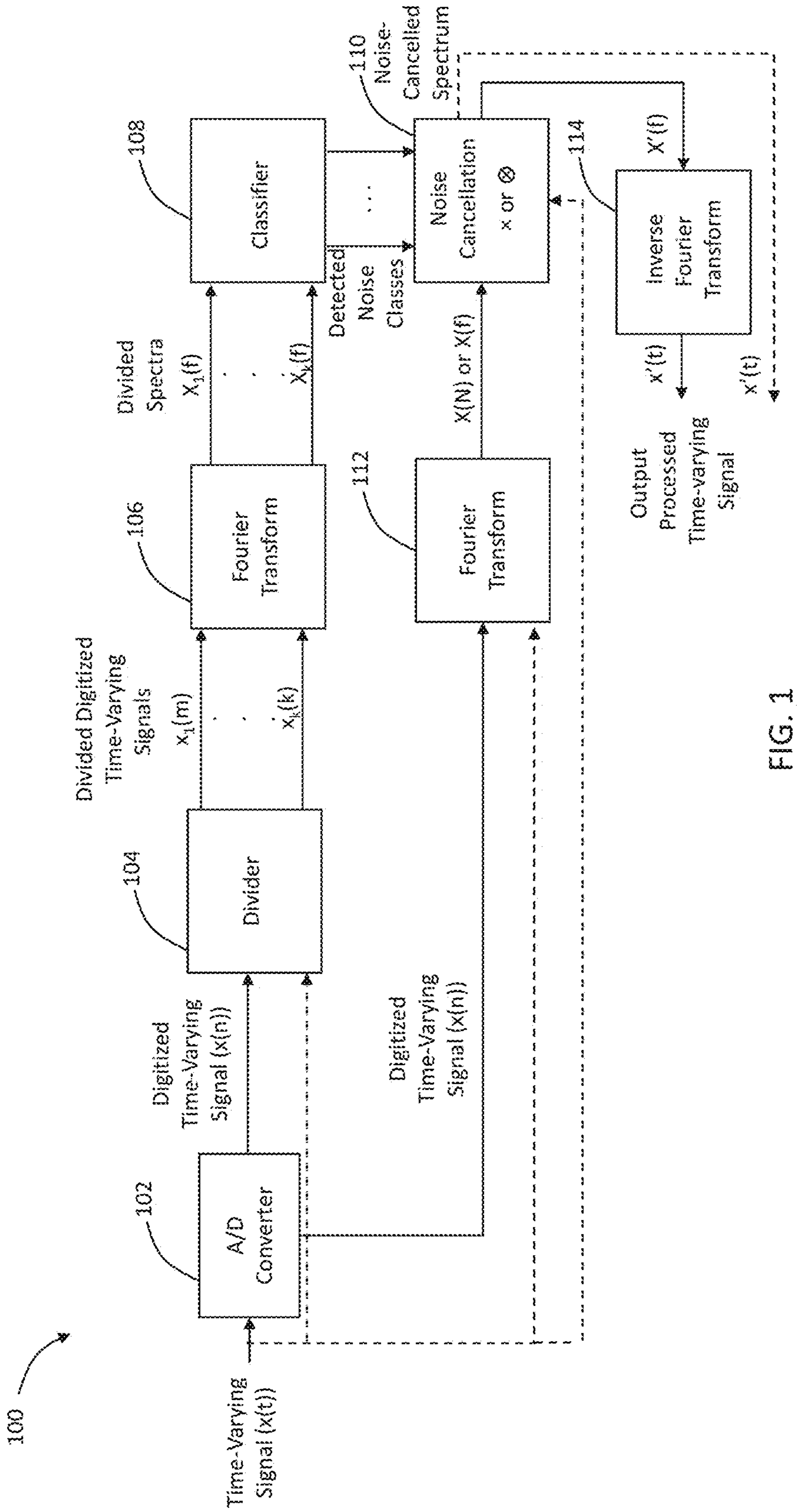
FIG. 1 is a block diagram depicting methods described in the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

The present disclosure presents a novel approach to selectively reduce ambient sounds that are considered as noise while allowing other sounds that are not considered noise unattenuated. Towards this end, a novel hearing protection system is presented designed to provide a user control of its surrounding noise. This system is capable of selectively recognizing sounds in an environment from a predefined library and labels them based on their type. This approach gives the user the ability to selectively filter out environmental sounds that are considered as noises. Once incoming time-varying signals have been processed to classify what is unwanted noise, the system then generates signals with a 180 degree phase shift delay to only cancel the classified noises that the user has selectively chosen to reduce or eliminate. The interaction of the added phase-shifted signals and the noise present would cause cancellation of the selected noise signals. Using the system of the present disclosure, users that are otherwise exposed to jobsite or other environmental noises can customize and choose which ambient sounds to eliminate or at least reduce and which sounds to hear based on their needs. For example, a user can cancel the sound of a jackhammer while still able to hear a siren signal or a crying baby.

The system of the present disclosure is initially configured to provide acoustic scene classification, in which the system classifies incoming sounds into predetermined acoustic classes. To classify incoming sounds, the first step is a design of experiment followed by data collection. The data would be from several sources that needed to be tagged and labeled. Thus, an incoming time-variant signal is divided into a plurality of segments of predetermined lengths, e.g., 20 ms segments. Each segment is converted to a frequency spectrum using a Fourier transform in the analog domain or discrete Fourier transform in the digital domain. Specifically, the incoming sound is either processed as an analog signal (i.e., the analog signal is divided into predetermined snippets and an analog Fourier transform, e.g., a fast Fourier transform, is performed on each snippet; or the incoming signal is processed as a digital signal by first digitizing the signal, e.g., by an analog to digital converter respecting Nyquist frequency requirements, known to a person having ordinary skill in the art, then applying a discrete Fourier transform to the digitized snippets). The Fourier transform (analog or digital) of each snippet provides a frequency spectrum for each snippet. According to one embodiment, various pre-processing may be implemented on the incoming audio signal. The pre-processing may include noise cancellation, silence reduction, normalization, etc., all known to a person having ordinary skill in the art. The next step is windowing of the signal into snippets to study the possible non-stationary signal as a quasi-stationary signal. By sliding a constant or varying size window over the signal (analog or digitized), the entire signal can be analyzed as a collection of snippets followed by generating frequency spectra of the snippets and tagging each spectrum as an associated spectrum for an associated snippet. After that, a feature extraction and feature selection steps are carried out utilizing one or more of feature extraction based on time-domain features, frequency domain features, cepstral domain features, discrete wavelet transform domain features, image/texture-based features, deep features, or a combination thereof. For instance, histogram of gradients (HOG) is one of the image/texture-based features that can be used to extract the time-frequency information from the audio signal. Then the selected features are used in a classifier for training and testing and based on the classifier's prediction signals in the spectra are classified as belonging to one or more classes of noise.

There are different approaches for the classifier of the present disclosure. According to one embodiment, the classifier is based on deep learning techniques used to detect and classify urban sounds. The classifier determines if a spectrum (from an analog/digital snippet of an audio file) contains one of the target sounds and provides a likelihood score of a recognized class. If the classifier cannot detect a class, it outputs an unknown score. Once the classifier has established presence of a class of noise, then the classifier applies a 180° phase-shifted version of the class to the spectra in order to cancel the noise classes.

Referring to FIG. 1, a general schematic of a system 100 according to one embodiment of the present disclosure is provided. As discussed in a general sense, above, the incoming time-varying signal (x(t), where t represents an index of time spanning from 0 to T seconds representing a period of collected signal) is first digitized via an analog-to-digital (A/D) converter 102 that respects the Nyquist criterion (i.e., the sampling rate of the A/D must be at least twice the highest frequency component of interest, e.g., 20 KHz, i.e., at least a 40 KHz sampling frequency, however, it is common to use a higher sampling rate). The A/D converter 102 may be a 10-bit converter, however, other bit capabilities, e.g., 8 or 12, are within the ambit of the present disclosure. As discussed above, the operation of the system of the present disclosure may be based on analog, rather than digital signal processing, in which case, the A/D converter 102 may be avoided altogether. The output of the A/D converter 102 is a digitized version of the time varying signal x(t) denoted as signal x(n), where n=0 . . . N−1, where N−1 is the sampling rate times T. The digitized signal is then passed through a divider 104 which divides the digitized signal into a plurality of snippets ($x_1$(m) . . . $x_k$(k), with each snippet having the same or different indexes representing the same or different number of samples in the associated snippet). In the case of analog processing, the divider 104 is configured to divide the incoming time varying signals into analog snippets (shown as the optional dashed line signal).

Thus, in the case of analog-only signals, the divider 104 divides the analog signal into a plurality of snippets ($x_1(t)$ . . . $x_k(t)$, with each snippet having the same or different amount of time in the associated snippet). Each snippet is then passed to a Fourier transform block 106 where a Fourier transform is carried out on each snippet. Where the snippets are digitized, the Fourier transform is based on a discrete Fourier transform, known to a person having ordinary skill in the art, applied to each digital snippet. Where the snippets are analog snippets, the Fourier transform is based on an analog Fourier transform, e.g., a Fast Fourier Transform, known to a person having ordinary skill in the art, applied to each analog snippet. The output of the Fourier transform block 106 includes a plurality of spectra (analog or digital), each spectrum of the plurality representing the frequency representation of an associated incoming snippet. These spectra are shown as $X_1(f)$ . . . $X_K(f)$, where K represents the number of snippets (again analog or discrete spectra). The plurality of spectra are then input to a classifier 108 which is configured to detect presence of one or more classes (Ci) of signals designated as noise in each spectrum. The classifier outputs to a noise cancelling block 110 for each incoming spectrum an output representing presence of the noise classes. If the classifier is unable to detect presence of a noise class in the incoming spectra, then it outputs a null for that class. A spectrum from the full digitized signal or analog signal (i.e., X(f)) is also provided to the noise cancelling block 110 via another Fourier transform block 112. As before, in the digital domain, the full digitized signal x(N) from the output of the A/D converter block 102 is provided to the Fourier Transform block 112 thus resulting in X(N) representing the spectrum of x(N) or the full signal x(t) is provided to the Fourier block 112 thus generating X(f) representing the spectrum of x(t). The noise cancelling block either 1) generates a 180° phase-shifted signal for each spectrum received from the classifier block 108 that is associated with a detected noise class and multiplies the phase-shifted signal with the full spectrum (X(N) or X(f), depending on whether digital or analog domain, respectively); 2) uses a band-limited filter to filter out noise associated with the spectrum by applying the bandlimited filter to the full spectrum (X(N) or X(f), depending on whether digital or analog domain, respectively); or 3) skips the spectrum associated with spectra that were not identified as belonging to a noise class. The 180° phase-shifted signal or the band limited filters may also be convolved with the time varying signal as shown by the dashed lines, thus avoiding the Fourier transform block 112 altogether (the noise cancellation block is shown with x representing multiplication in frequency domain or x with a circle representing convolution). The convolution operations are replacement for items 1 and 2, above. Said noise cancellation operation can occur sequentially for each of the spectra. In other words, the full spectrum (X(N) or X(f)) may be treated with one of the three enumerated operations discussed above with a first identified class, to generate a first noise cancelled spectrum, and then treated again with one of the three enumerated operations for the next class, and so on, until all classes have been accounted for. For example, suppose there are two classes of noises identified by the classifier 108: e.g., a jackhammer and an air conditioning unit. In this situation, the full spectrum (X(N) or X(f)) is first treated by one of the three enumerated options to generate a first intermediate spectrum, and then treated again to generate the output spectrum from the noise cancellation block 110.

After the noise cancellation operation, the noise-cancelled spectrum is presented to an inverse Fourier transform block (discrete for digital domain or analog, e.g., an inverse fast Fourier transform, for analog domain) to convert the spectrum to a time based output (x'(t)) (or alternatively the output of convolution is provided as the time based output (x'(t)) as indicated by the dashed line) as the output of the system 100.

In an alternative embodiment, each spectrum output from the Fourier transform block 106 used by the classifier 108 to identify noise classes, is treated according to one of the three enumerated options discussed above. The spectrum associated with a first identified noise class once treated according to options 1 or 2 above would result in negligible output out of the noise cancellation operation. According to the above example, suppose one spectrum is associated with a jackhammer identified noise class, while another noise class is identified as an air conditioning noise. Treatment of the spectrum associated with the jackhammer with options 1 or 2, above, results in a negligible output for that snippet. The same treatments for other snippets associated with classified noise classes results in negligible outputs for those classes, e.g., the snippet associated with air conditioning noise. The noise cancellation block 110 then combines all treated or untreated spectra (according to one of the three enumerated options) into one unitary spectrum by sampling adding all treated or untreated spectra and present that as the output of the noise cancellation block 110.

In the classifier, for the deep learning approach, two different alternative neural network architectures were used: 1) spectra are used as input to the classifier, as shown in FIG. 1) or time-varying snippets can be fed into the classifier which is trained to detect one or more classes of noise.

One challenge with selectively removing noise is that sound varies in speed. For example, if the goal is to detect a sound of a baby crying, one baby might cry very quickly and another baby might cry very slowly, producing a much longer sound file with much more data. Both sound files should be detected as the same class: baby crying. That can be the same for all other classes such as door knocking, airport announcement, fire alarm, construction noises, etc. To address this challenge, special tricks and extra processing are applied in addition to a deep neural network. Thus, the length of snippets may require adjustment based on what is detected in the incoming time varying signals. Such an adjustment may be carried out by an automatic feedback mechanism, especially when the signal associated with a noise class is repetitive and/or cyclic. The length of snippets are not only variable across all snippets, but may also be variable across neighboring snippets.

Figure 2:
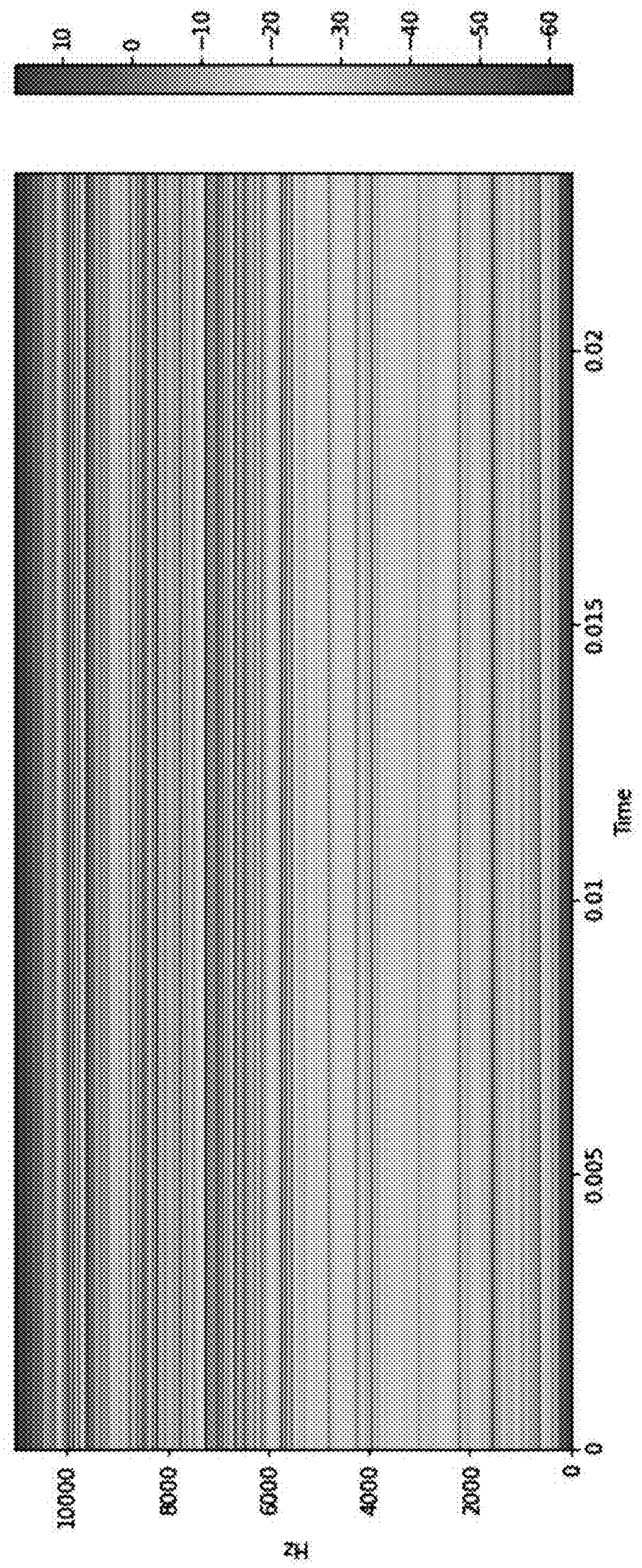
FIG. 2 is a graph of frequency in Hz vs. time in seconds representing a spectrum (i.e., the Fourier Transform of one 20 ms snippet of an incoming time varying signal) on the Y-axis against the 20 ms of the signal on the X-axis.

The first step in event detection is to feed the spectra into a neural network that has been trained to recognize patterns in the spectra. A novel approach is provided herein to provide a specific type of dataset associated with a frequency-time image as the input data to the neural network. An example of such an image is provided in FIG. 2 which is a graph of frequency in Hz vs. time in seconds. This graph provides the spectrum (i.e., the Fourier Transform of one 20 ms snippet) on the Y-axis against the 20 ms on the X-axis. If this process is repeated on all snippets (e.g., all 20-millisecond chunks of time-varying signals), we end up with a histogram shown in FIG. 3. A neural network can find patterns in the sort of image shown in FIG. 3 more easily than raw sound waves or spectra. Therefore, the classifier shown in FIG. 1, first generates a histogram from all the spectra for all the snippets and provide that to the neural network as input.

The neural network according to one embodiment is a recurrent neural network with memory that can be used to improve future predictions, as known to a person having ordinary skill in the art.

After the entire audio file is processed through the neural network (one snippet at a time), each audio snippet is processed to detect the event that most likely happened during that snippet. To build an event recognition system that performs with an acceptable accuracy we will need a substantial amount of training data. We used a sound dataset containing 8732 sound excerpts of urban sounds from 10 different classes. Ten such classes with an example of a graph of sound amplitude vs. time from each class is shown in FIGS. 4A-4J (i.e., FIGS. 4A, 4B, 4C, 4D, 4E, 4F, 4G, 4H, 4I, and 4J). The datasets shown in FIGS. 4A-4J are provided for example only and no limitation is thereby intended. Many more such datafiles/classes can be generated depending on the noise to be eliminated. For example, the system of the present disclosure can be used for passengers on an airplane. In such a case, the sound of an airplane inside the passenger compartment would be an appropriate dataset for training purposes. For each of these samples, we extract Mel-Frequency Cepstral Coefficients (MFCC), known to a person having ordinary skill in the art. The MFCC contains the frequency distribution across the window size. It will allow us to analyze both the frequency and time characteristics of the sound. MFCC were used to identify features for classification.

Figure 3:
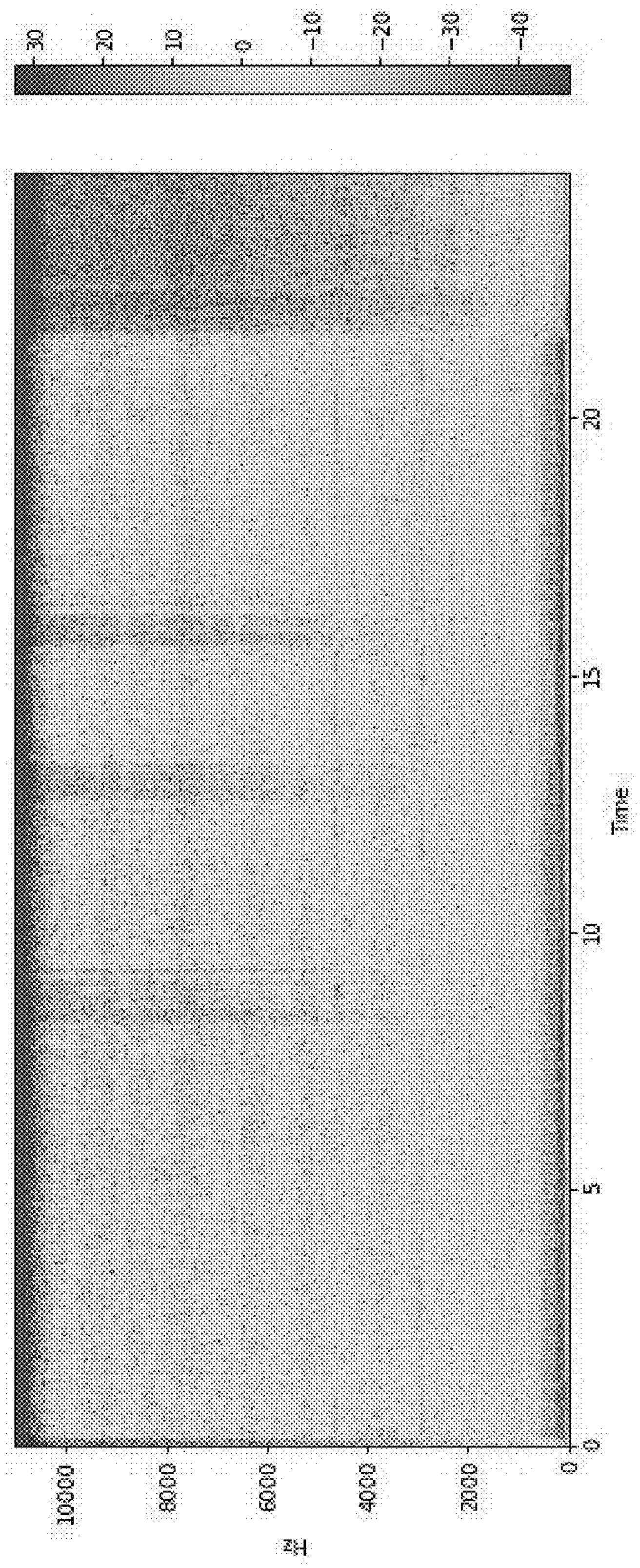
FIG. 3 is a histogram of a plurality of signals shown in FIG. 2 for a plurality of snippets.
Figure 4A:
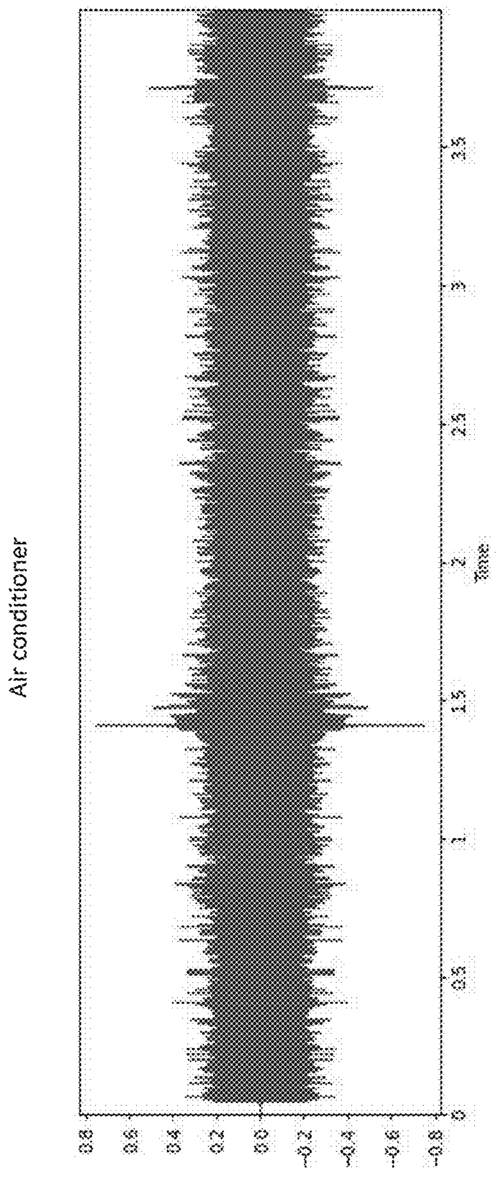
FIGS. 4A, 4B, 4C, 4D, 4E, 4F, 4G, 4H, 4I, and 4J are each graphs of sound amplitude vs. time for different classes of sounds.
Figure 4B:
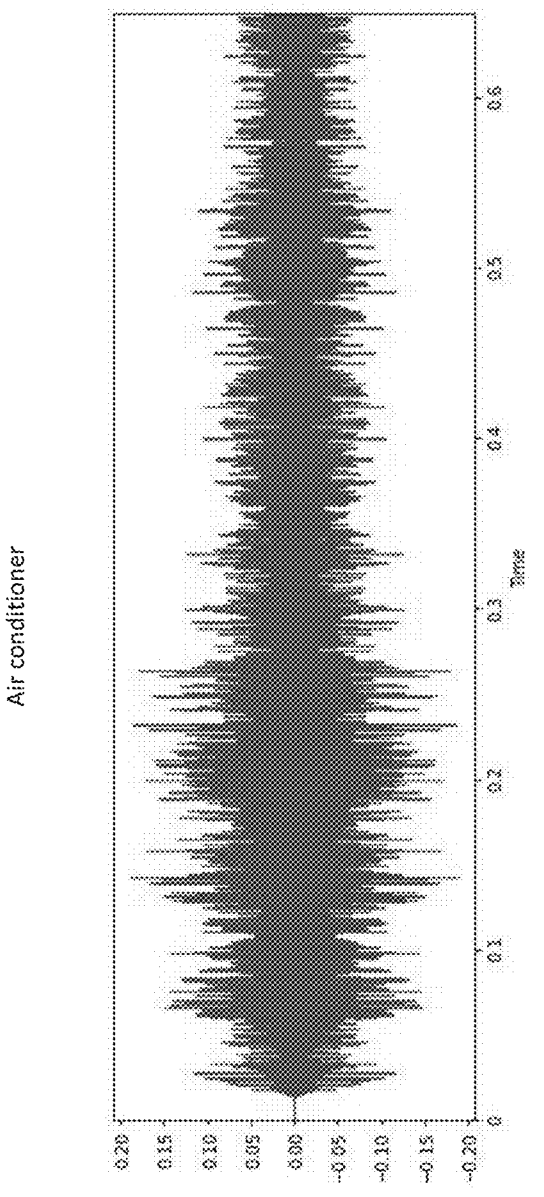
Figure 4C:
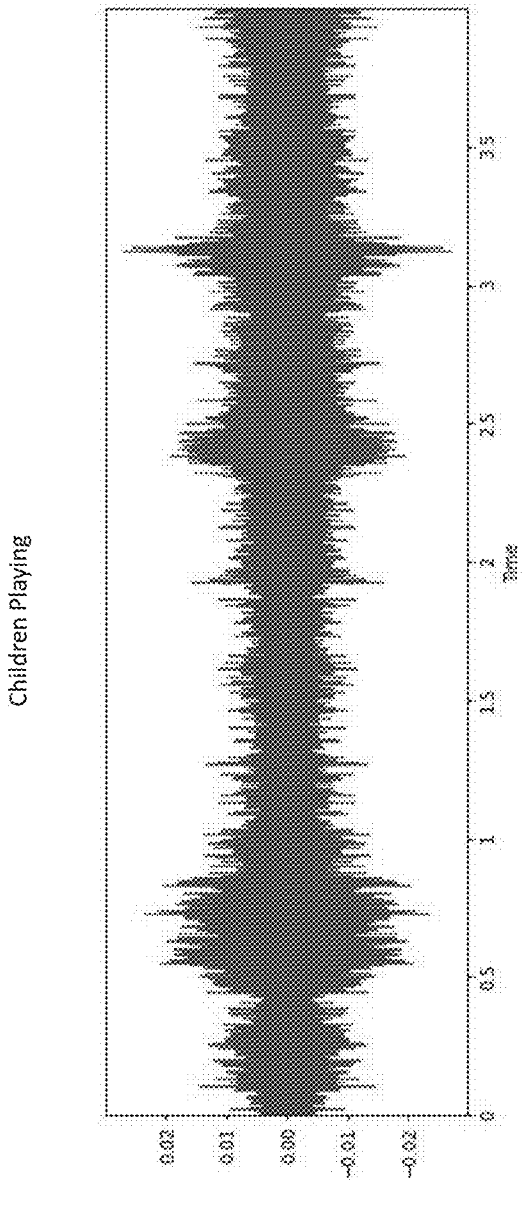
Figure 4D:
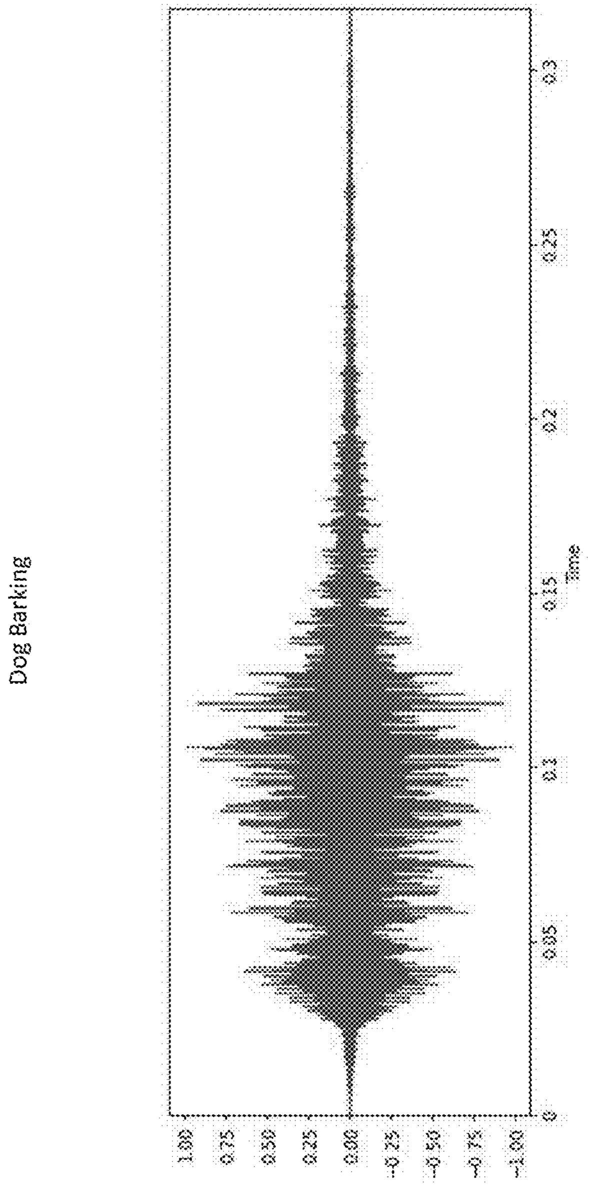
Figure 4E:
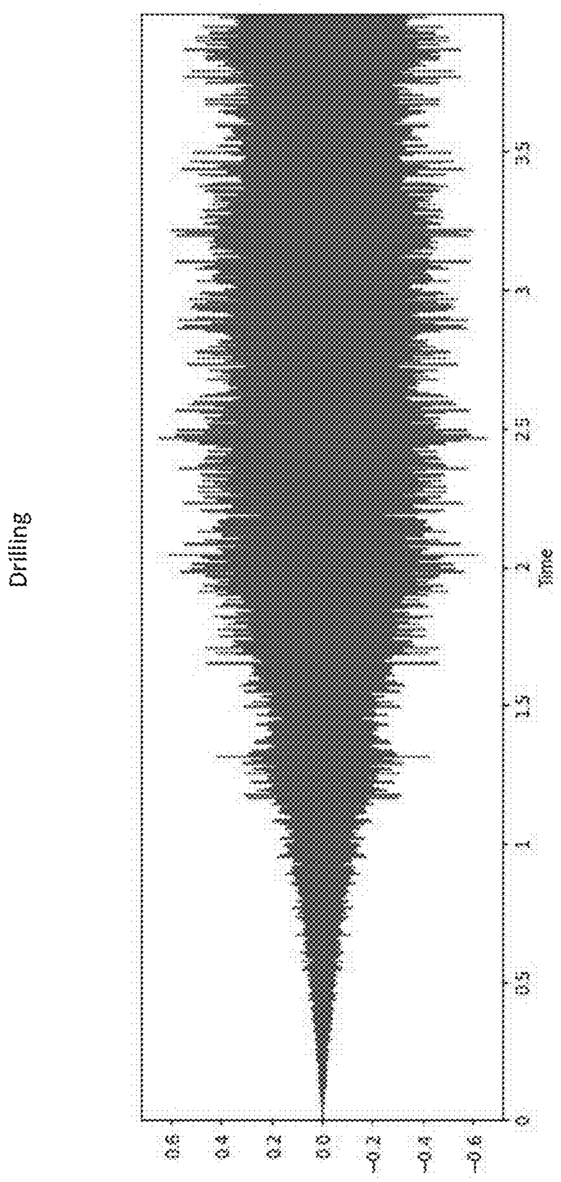
Figure 4F:
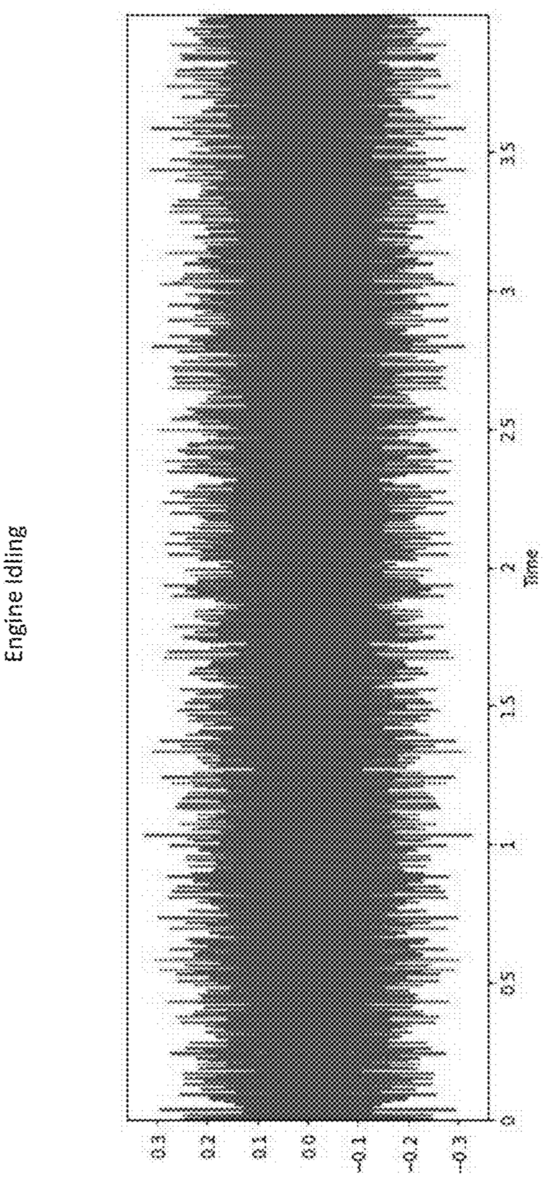
Figure 4G:
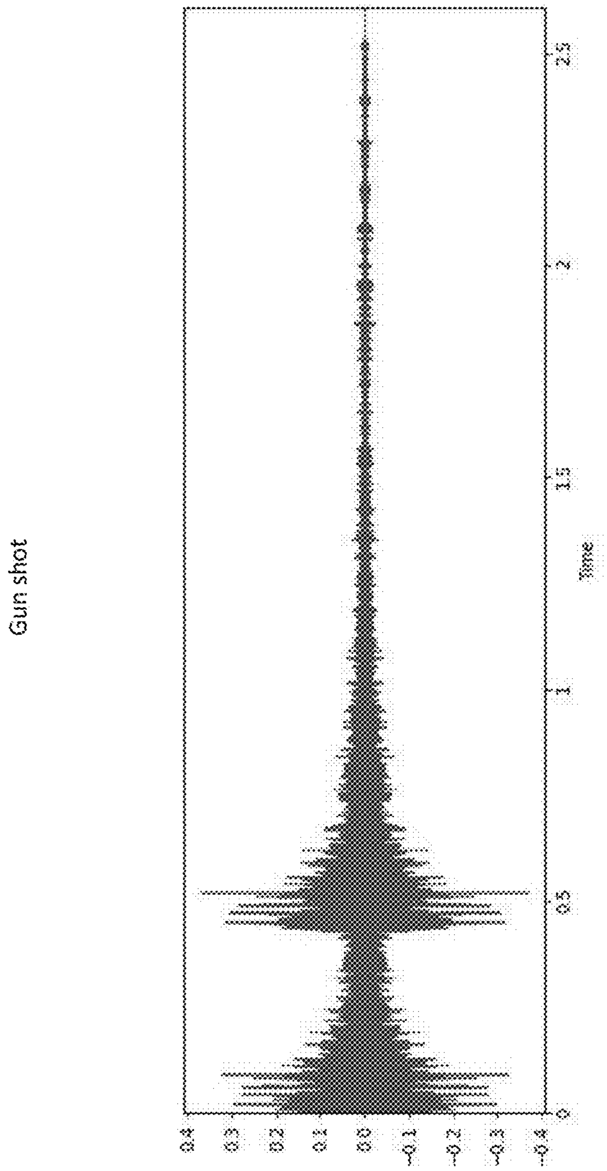
Figure 4H:
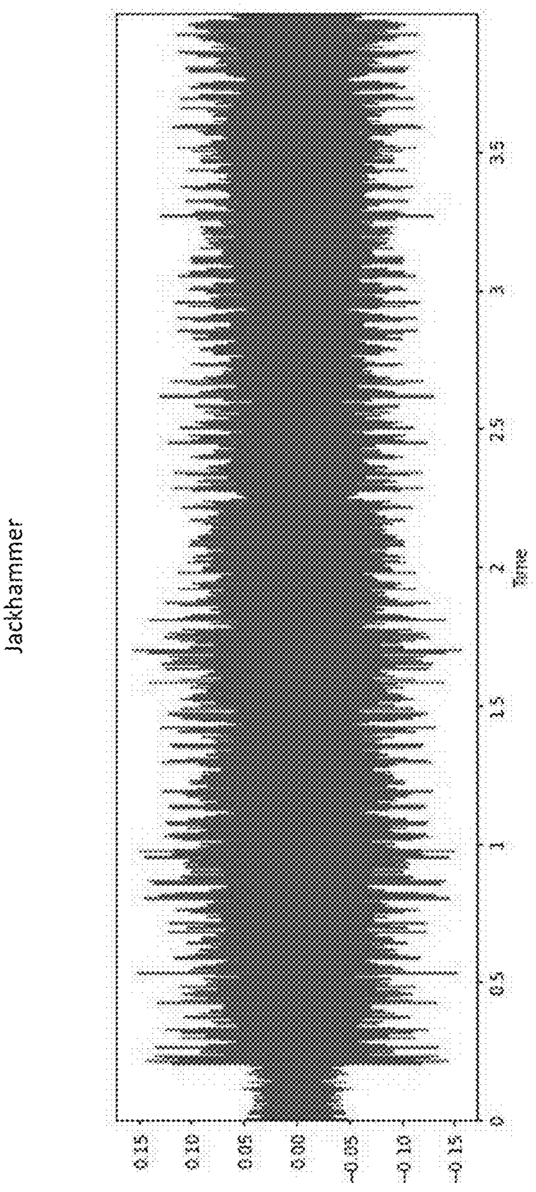
Figure 4I:
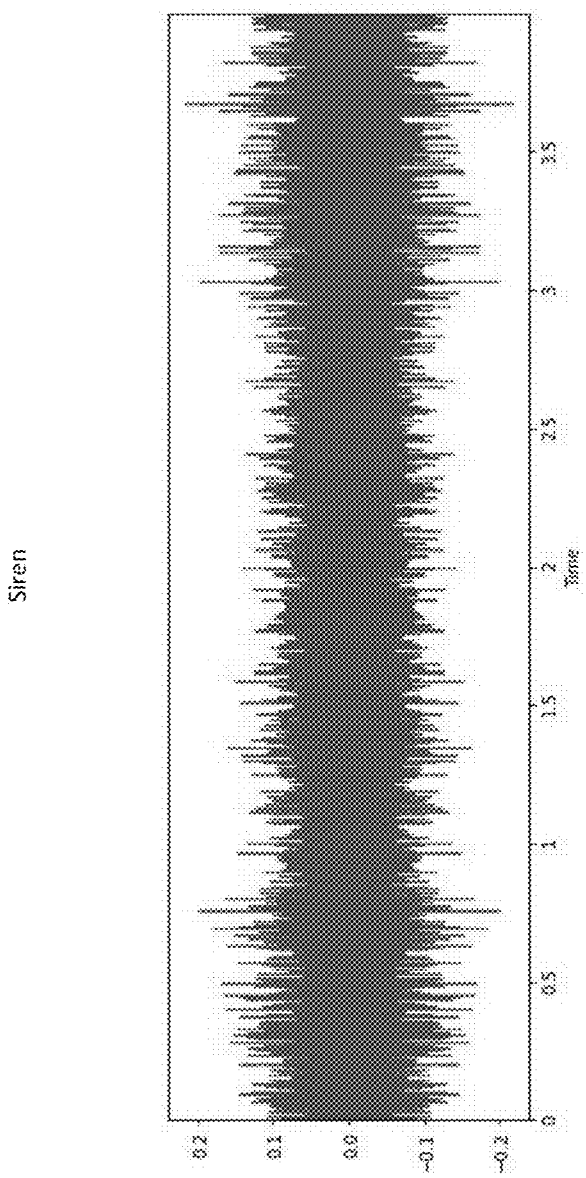
Figure 4J:
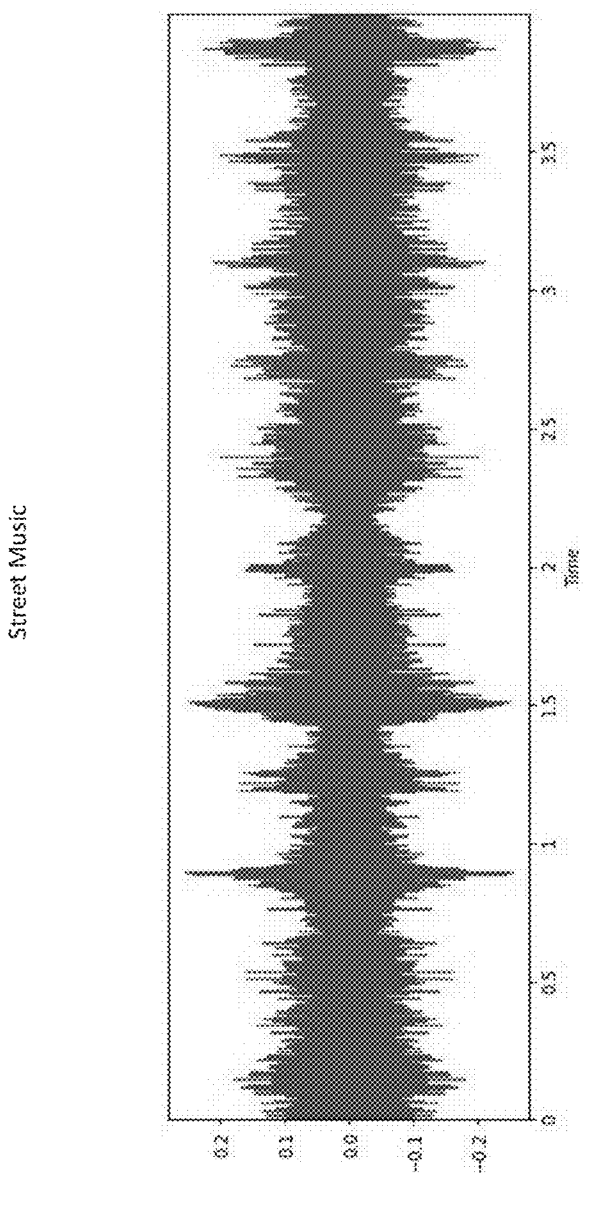

After extracting MFCC's for every sound file, we split the dataset into training and testing sets. The same type of histogram as shown in FIG. 3 is made for each of the classes of sound shown in FIGS. 4A-4J. A deep learning architecture was then constructed and trained with the training dataset. The accuracy of the model for training dataset is 96%. Accuracy was defined as the ratio of correct classifications to the number of classifications. Once the model has been trained, the model can be used to carry out predictions of the presence of each class. The accuracy of the model for testing the dataset is 90%.

According to another embodiment, the present disclosure discloses another embodiment in which received ambient signal (incoming time-variant signal) is initially filtered to attenuate all frequency components to thereby generate an attenuated time-varying signal, e.g., a band-rejection filter may be applied to the received ambient signal to attenuate all signals within 20 Hz to 20 kHz. Next, in this alternative embodiment, a processor presents to a user a plurality of classes to be selectively chosen for sounds that are to be allowed through while all other sounds to be attenuated or eliminated. The user through a user interface selectively chooses one or more selected classes amongst said plurality of classes of signals to be broadcasted while other signals are to be attenuated or eliminated altogether. The processor continually applies the incoming time-varying signal to a classifier (discussed above) to identify presence of the one or more selected classes in the incoming time-varying signal. For each of the one or more selected classes identified as being present by the classifier, the processor adds a snippet of a pre-recorded signal associated with each of the identified classes each followed by a period of substantially no signal to thereby generate a string of signal snippets associated with the identified classes, thereby generating a repeating string of signal snippets. The processor then repeats the repeating string of signal snippets in a loop. If during the loop, a new selected class is identified by the processor as being present in the incoming time-variant signal, the processor adds the associated signal snippet to the repeating string of signal snippets to be repeated in the loop. Alternatively, if one or more of the selected classes are found to be missing after being initially detected in the incoming time-variant signal, the associated signal snippet will be deleted by the processor from the repeating string of signal snippets to be repeated in the loop. The processor then combines the attenuated version of the received time-varying signal with the repeating string of signal snippets to thereby generate a time-varying outgoing signal. The processor then broadcast the time-varying outgoing signal through one or more transducers, e.g., a headphone. The operation discussed here is performed real-time or near real-time.

An example is provided below. Suppose a construction worker is interested in attenuating all sounds coming through a pair of headphones except several classes, for example the worker is interested in hearing sirens, and dog barking, but wants to attenuate all other sounds. He/she then chooses these two classes of sounds. Suppose further, neither of these two sounds are present as part of ambient incoming time-variant signals. In this case, the processor simply attenuates all sounds and presents a near zero-signal through the headphones. Next, suppose an emergency vehicle, e.g., an ambulance, is approaching the work area. The processor recognizes the sound as a selected class in the incoming time-variant signal once the sound of the siren has reached a predetermined threshold indicating proximity of the sound to the work area; and constructs a prerecorded sound snippet of a siren followed by a period of zero-signal as the repeating string of signals which includes the sound of the prerecorded siren. Next, suppose a barking dog approaches the work area, the processor again recognizes the sound as another selected class in the incoming time-variant signal once the sound of the barking dog has reached a predetermined threshold indicating proximity of the sound to the work are and constructs a prerecorded sound snippet of a dog bark followed by a period of zero-signal to the repeating string of signals which now includes the sound of the prerecorded siren followed by a period of silence and the sound of the prerecorded dog bark followed by period of silence. Next, suppose the sound of the siren has diminished to an intensity below the predetermined threshold indicating the emergency vehicle has moved away from the work area. To avoid intermittent crossing of the predetermined threshold, a hysteresis filter can be applied to the sound of the siren to ensure it has indeed moved away from the work area before registering the departure of the vehicle from the work area. Once the emergency vehicle is registered to have moved away from the work area, the processor removes the associated prerecorded signal snippet associated with the siren from the repeating signal snippets. The same procedure is followed for the dog barking. That is once the sound of dog barking has been registered as having moved away from the work area, again by application of the hysteresis filter, the processor removes the associated prerecorded signal snippet associated with the dog barking from the repeating signal snippets. In this case the repeating signal snippet is reduced to zero signal snippets and the processor returns to only broadcasting the attenuated incoming time-variant signal until another class is detected by the processor.

In yet another alternative approach, instead of removing all sounds by the initial band-reject filter and then adding pre-recorded sound snippets associated with detected classes, the processor may isolate the frequency spectrum of the sound that is associated with a selected class which has been detected in the incoming time-variant signal and construct a 180° phase-shifted version of a spectrum that allows the detected class through but which removes all other frequency components and adds that construed spectrum to the incoming time-variant signal in order to attenuate or remove signals outside of the associated detected classes. The addition of the 180° phases shifted spectrum can be accomplished by obtaining a frequency spectrum of the entire incoming time-variant signal and multiplying the constructed spectrum with the spectrum of the incoming time-variant signal. This process can be applied for all such detected classes. However, this process may suffer from introduction of stray harmonics of the added spectra thus resulting in additional unwanted noise/sounds. In this process, as just mentioned, the 180° phases shifted spectrum associated with the frequencies outside of the detected class may be multiplied by the spectrum of the incoming time-variant signal. Alternatively, the 180° phase shifted spectrum may be converted to a time-series via an inverse Fourier transform operation, e.g., an inverse fast Fourier transform or an inverse discrete Fourier transform, and the processor may further convolve the converted time series with the incoming time-variant signal. This alternative approach is configured to be accumulative for all detected classes. Thus, if a first detected class includes frequency components between $f_1$ and $f_2$ while a second detected class includes frequency components between $f_3$ and $f_4$, the constructed 180° phase shifted spectrum would result in cancellation/attenuation of frequency components outside of $f_1$-$f_2$ and $f_3$-$f_4$.

Still further according to another embodiment, for each detected class, the processor may generate a software-based bandpass filter or switch in one or more existing bandpass filters with the incoming time-variant signal in order to pass the frequency components of the detected class but yes remove all other frequency components. This alternative approach is configured to be accumulative for all detected classes. Thus, if a first detected class includes frequency components between $f_1$ and $f_2$ while a second detected class includes frequency components between $f_3$ and $f_4$, the application of the bandpass filters would result in cancellation/attenuation of frequency components outside of $f_1$-$f_2$ and $f_3$-$f_4$.

Attached to the present disclosure as Appendix-A is software associated with the disclosed methodology of the present disclosure, incorporated by reference herein in its entirety into the present disclosure, in particular the methodology associated with the classifier.

Those having ordinary skill in the art will recognize that numerous modifications can be made to the specific implementations described above. The implementations should not be limited to the particular limitations described. Other implementations may be possible.

The invention claimed is:

1. A method of selectively passing through signals associated with one or more classes of signals while attenuating other signals, comprising:
- receiving an incoming time-varying signal as ambient signal by one or more sensors;
- applying a signal cancellation filter to the incoming time-varying signal to thereby generate an attenuated version of the incoming time-varying signal;
- selectively choosing one or more selected classes amongst a plurality of classes of signals to be broadcasted while other signals are to be attenuated;
- continually applying the incoming time-varying signal to a classifier to identify presence of the one or more selected classes in the incoming time-varying signal;
- for each of the one or more selected classes identified as being present by the classifier:
  - adding a snippet of a pre-recorded signal associated with each of the identified classes each followed by a period of substantially no signal to thereby generate a string of signal snippets associated with the identified classes; and
  - repeating the string of signal snippets in a loop;
- combining the attenuated version of the received time-varying signal with the repeated string of signal snippets to thereby generate a time-varying outgoing signal; and
- broadcasting the time-varying outgoing signal through one or more transducers.

2. The method of claim 1, wherein the incoming time-varying signal is a sound signal.

3. The method of claim 2, wherein the one or more sensors are each a microphone.

4. The method of claim 3, wherein the one or more transducers are each a speaker in a headphone.

5. The method of claim 1, wherein the incoming time-varying signal is a wireless signal.

6. The method of claim 1, wherein the incoming time-varying signal is a wired signal.

7. The method of claim 1, wherein the step of applying a signal cancellation filter includes
- transforming the incoming time-varying signal into a frequency spectrum; and
- applying a band-rejection filter to the spectrum.

8. The method of claim 7, wherein transforming the incoming time-varying signal into the frequency spectrum is based on a Fourier transform of the incoming time-varying signal.

9. The method of claim 8 wherein the Fourier transform is a Fast Fourier transform.

10. The method of claim 8, wherein the Fourier transform is a discrete Fourier transform.

11. A method of selectively passing through signals associated with one or more classes of signals while attenuating other signals, comprising:
- receiving an incoming time-varying signal as ambient signal by one or more sensors;
- establishing a time-varying incoming signal spectrum;
- selectively choosing one or more selected classes amongst a plurality of classes of signals to be broadcasted while other signals are to be attenuated;
- continually applying the incoming time-varying signal to a classifier to identify presence of the one or more selected classes in the incoming time-varying signal;
- for each of the one or more selected classes identified as being present by the classifier:
  - isolating a spectrum associated with the identified class;
- combining all isolated spectra associated with all the identified classes as a pass-through spectrum;
- removing the pass-through spectrum from the incoming time-variant signal spectrum to thereby generate an all-reject spectrum;
- establishing a 180° phase-shifted spectrum of the all-reject spectrum;
- applying the all-reject spectrum by the incoming time-variant signal spectrum to thereby generate an all-pass spectrum;
- converting the all-pass spectrum to a time-variant outgoing signal; and
- broadcasting the time-varying outgoing signal through one or more transducers.

12. The method of claim 11, wherein the one or more sensors are each a microphone and wherein the one or more transducers are each a speaker in a headphone.

13. The method of claim 11, wherein the step of establishing the time-varying incoming signal spectrum includes:

applying a Fourier transform to the incoming time-varying signal, and wherein the step of converting the all-pass spectrum to the time-variant outgoing signal includes:

applying an inverse Fourier transform to the all-pass spectrum.

14. The method of claim 13, wherein the Fourier transform is one of a Fast Fourier transform and discrete Fourier transform.

15. The method of claim 14, wherein the inverse Fourier transform is one of an inverse Fast Fourier transform and an inverse discrete Fourier transform.

16. A method of selectively passing through signals associated with one or more classes of signals while attenuating other signals, comprising:

receiving an incoming time-varying signal as ambient signal by one or more sensors;

establishing a time-varying incoming signal spectrum;

selectively choosing one or more selected classes amongst a plurality of classes of signals to be broadcasted while other signals are to be attenuated;

continually applying the incoming time-varying signal to a classifier to identify presence of the one or more selected classes in the incoming time-varying signal;

for each of the one or more selected classes identified as being present by the classifier:

isolating a spectrum associated with the identified class;

combining one or more bandpass filters associated with each of the isolated spectrum to thereby generating an all-pass spectrum;

converting the all-pass spectrum to a time-variant outgoing signal; and broadcasting the time-varying outgoing signal through one or more transducers.

17. The method of claim 16, wherein the step of establishing the time-varying incoming signal spectrum includes:

applying a Fourier transform to the incoming time-varying signal, and wherein the step of converting the all-pass spectrum to the time-variant outgoing signal includes:

applying an inverse Fourier transform to the all-pass spectrum.

18. The method of claim 17, wherein the Fourier transform is one of a Fast Fourier transform and discrete Fourier transform.

19. The method of claim 14, wherein the inverse Fourier transform is one of an inverse Fast Fourier transform and an inverse discrete Fourier transform.

* * * * *